United States Patent Office
3,488,209
Patented Jan. 6, 1970

3,488,209

COATED ASBESTOS CEMENT PRODUCTS

Osborn Ayers, Westfield, Norman S. Greiner, Somerville, and Michael Homiak, Bound Brook, N.J., assignors to Johns-Manville Corporation, New York, N.Y., a corporation of New York No Drawing. Filed Oct. 23, 1965, Ser. No. 504,066
Int. Cl. B28b *11/04;* B44d *1/40;* C04b *41/32*
U.S. Cl. 117—54 10 Claims

ABSTRACT OF THE DISCLOSURE

Method of improving the adhesion and durability of silicate coatings upon asbestos-cement articles comprising pretreating the asbestos-cement substrate with a dilute aqueous solution of given acid salts to enhance the receptivity of the surface of the asbestos-cement substrate for the subsequent silicate coating producing a more uniform and stronger bond therebetween and increase the durability of the silicate coating, and the improved more enduring product produced thereby.

This invention comprises a new method of manufacturing improved asbestos-cement articles and the enhanced products thereof. More specifically, this invention comprises improvements in the application to asbestos-cement materials, or formation thereon, of insoluble silicate coatings of the type of related prior patents comprising, for example, U.S. Patents Nos. 1,879,155; 2,309,962; 2,347,684; 2,350,030; 2,354,350; 2,354,351; 2,372,284; 2,372,285; 3,197,579; etc., and the resultant enhanced silicate coated asbestos-cement products of the novel means.

This inveniton primarily constitutes improvements and advances in the prior means or methods of applying and effecting the aforementioned subject ceramic glaze type insoluble silicate coatings, and in the coated cementitious products of these and other patents. The set forth exemplary materials, means, techniques, etc., of said prior art disclosures and processes, therefor, are all incorporated herein by reference and constitute a part of the instant disclosure and invention.

Although certain of the means or processes and resultant products of the above mentioned patents, and possibly others, have achieved degrees of commercial success, and have met the immediate demands of their designed applications as, for example, in the manufacture of a class of exterior products such as siding and roofing shingles wherein the primary requirement may simply be a water-proofing to inhibit the formation of carbonate bloom, the prior means have been found to entail deficiencies which are more evident or pronounced and thus objectionable in products designed for interior or furniture applications comprising sheets or sections for wall panels and furniture components, as, for example, table or counter tops, and as such they have incurred decided obstacles in their application to materials intended for more aesthetically exacting and demanding uses. For instance, blisters, breaks or other impediments in the silicate coating films which are not evident, or of any particular notice or concern on an asbestos-cement roofing or siding shingle, and normally never observed in such locations, become highly conspicuous and objectionable when present in a table or counter top or the like furniture component which typically is the subject of constant, close visual observation and touch. Moreover, asbestos-cement materials designed for interior, furniture, and the like uses or products, unlike common exterior building shingles, are sanded or ground to smooth and polish their surfaces with the result of exposing a greater number and/or a greater area of the asbestos fibers or bodies contained therein, such as fiber pencils or bundles embedded immediately adjacent to such surfaces, which presents a base substrate having innumerable areas or spots of an unlike, and typically reduced affinity for or bonding capacity with the subsequently applied silicate coatings. Thus, this differential in the adhesive potential with the final silicate coating over the surface renders the sanded asbestos-cement article more susceptible to breaks and blisters in the coating film than in the common external shingles which are not sanded. Also the demands upon common interior or furniture components such as wall panels, tables and counter tops consisting of silicate coated asbestos-cement materials are typically infinitely greater than for exterior shingles and the like building products notwithstanding the exposure of the latter to the elements, because of the continuous abrasion of routine use and cleaning and exposure to caustic agents such as household chemicals, cosmetics, temperatures of burning cigarettes, and the like aggressive contacts or conditions normally encountered in these functional applications.

It is the primary object of this invention to provide an economical and effective means of increasing the adhesive bond of common silicate based coating over all areas or surface conditions of asbestos-cement materials.

It is also a primary object of this invention to provide an economical and effective means of decreasing to the point of substantially eliminating any blisters, breaks and the like impediments in the common silicate coating films throughout the entire coated surface of asbestos-cement articles or materials.

It is a further object of this invention to provide means of facilitating and accelerating the insolubilization or gelling and bonding the common silicate coating materials when applied to asbestos-cement articles.

It is a further object of this invention to provide means of increasing the exterior weathering performance and resistance, and the hardness and physical durability of common silicate coatings applied to asbestos-cement materials.

It is a further object of this invention to provide a more economical and effective means of manufacturing and producing common silicate coated asbestos-cement products in markedly reducing the defects therein and in turn the number of rejects with the result of increasing routine production recovery to about 98% or greater.

It is a still further and pronounced object of this invention to provide silicate coated asbestos-cementitious products and articles of significantly improved coating properties through more uniform and effective adhesion and bonding of the coating film over all areas, including minimum blisters or breaks, and of enhanced resistance to weathering, abrasion, stains, etc. among other advantages.

These and other objects and advantages of the invention will become more apparent from the hereinafter detailed descriptions thereof.

This invention generally comprises the pretreatment of the substrate surface of asbestos-cement articles which are subsequently to be coated with a silicate material pursuant to conventional procedures as shown by the aforementioned patents and related prior art. The pretreatment constituting the basis of this invention comprises the application to the surface of the asbestos-cement substrate an agent consisting of a specific group of acid-salts, which, apparently through some physical and/or chemical mechanism, itself interacts with the phases of the substrate surface of the base cementitious material and the subsequent silicate coating composition or components thereof, rendering each more receptive to the other, and/or incites and accelerates the activity of the silicate coating composition facilitating its affinity for and adhesive uniting with and bonding to the asbestos-cement substrate surface and its permanent insolubilization thereon. In any case, or regardless of the means or mechanism thereof, the pretreatment with, or application of relatively minor amounts of the agents of this invention enhance both the strength and uniformity of the tenacity of the silicate coating film adherence with the asbestos-cement substrate, facilitate and accelerate the gelling or insolubilization and resultant continuous silicate film formation and bonding thereof to the base, and the hardness and durability of the completed coating as will be demonstrated hereinafter in the examples.

Specifically the present invention consists essentially of the application of a dilute aqueous solution, for example approximately 3% by weight to approximately 10% by weight, of an acid-salt comprising monoammonium phosphate, dibasic ammonium phosphate, acid aluminum phosphate, or cupric ammonium sulfate, in such amounts as to provide a substantially uniform coverage of about 2 to about 20 grams of said solution per square foot of the substrate surface of the asbestos-cement article to be subsequently silicate coated. The acid-salt solution concentrations and the quantity thereof applied should, of course, be commensurately proportioned or adjusted with low concentrations of solution being applied more liberally and higher solution concentrations thereof more stringently applied. It has been found that to effect discernible improvements in the subsequent silicate coating process and resultant products thereof, the acid-salt application must provide a coverage of about 2 grams of an approximately 5% by weight solution per square foot of asbestos-cement surface or about 0.10 gram of solute per square foot. Also quantities and concentrations of the solution should be such as to completely penetrate the surface of the cement article and not so high as to result in salt deposits on the surface thereof upon evaporation of the water content. Powder-like salt deposits, as should be evident, diminish and may, if excessive, completely destroy any effective bonding of the subsequent silicate coating to the asbestos-cement substrate, and frequently the application in excess of about 20 grams per square foot of an approximately 5% by weight of solution will result in detrimental surface deposits of powdered salts to the point of impairing the bond. The effective porosity of the substrate cementitious body will of course significantly influence the amount of solution applicable including the retention of efficacious proportions available adjacent the surface for subsequent action upon the silicate coating materials, or on the other hand as diminishing the maximum amount applicable without deleterious salt deposits. The means of application of the solutions of the agents of this invention to asbestos-cement materials may comprise any common technique, as for example, spray, roller, brush, etc.

The above described relatively uninvolved and easily effected, economical application of the pretreatment serves to enhance the carrying out of the subsequent silicate coating procedures of the type of the hereinbefore cited patents and related prior art, and improve the resultant products thereof, comprising in general the administration of soluble sodium and/or potassium silicate solutions, preferably containing an apt clay composition and/or a dibasic metal oxide(s) such as zinc oxide, and insolubilizing the said silicate composition by subjecting the same to effective temperatures for the specific composition.

The utility and numerous improved conditions or properties and benefits of the means of this invention, and relative degrees thereof, are demonstrated in the hereinafter examples wherein the effects of this invention are compared with an effective and successful commercial silicate coating and insolubilzation treatment for asbestos-cement articles given as a standard, and the pronounced upgrading and advantages of the effects of this invention in several aspects are set forth for comparison with this standard. The following examples comprise detailed illustrations of preferred and typical means, agents, conditions and techniques for the practice of this invention and demonstrate the pronounced advantages and utility thereof. It is to be understood that the specific agents, compositions, or means, conditions and techniques or the like details given for carrying out this invention in the examples are primarily exemplary and are not to be construed as limiting the invention to any specific means, agents, conditions, techniques and the like set forth therein.

The asbestos-cement base material or sheets of the examples illustrating this invention and of the standards all consisted of 4 feet x 8 feet conventionally produced, steam-cured commercial products of about 100 p.c.f. density and of the subsequently given compositions cured at 100 p.s.i. of steam (338° F.) for 16 hours. In the examples the means of this invention were incorporated into the hereinafter described typical silicate coating process for common asbestos-cement materials. The interjected operation effecting the invention comprised initially applying to a cured and thoroughly dried (8 hours at 300° F. then 8 hours at 400° F.) asbestos-cement sheet product one or more of the given acid salt agents. In Examples 1 through 9 the acid salt consisted of the preferred agent, a 4.5 to 5% by weight aqueous solution of monoammonium phosphate ($NH_4H_2PO_4$) sprayed at a rate designed to provide a coverage of about 5 to 10 grams of solution per square foot. Upon substantial penetration and drying of the applied aqueous solution of the invention, the pretreated asbestos-cement sheets were thereafter coated with the silicate material pursuant to a conventional production procedure and in an identical manner as the standards which constituted commercial products. The silicate coating comprised preheating both the samples treated according to the invention and the standard products to a surface temperature of at least about 105° F. up to about 125° F. on the face to be coated and promptly applying between about 18 to 20 grams per square foot of a standard silicate coating composition such as set forth in U.S. Patent No. 3,197,529 comprising, in approximate percentages by weight, of:

| | Percent |
|---|---|
| Potassium silicate (27.3% solids aqueous solution) | 58.2 |
| Sodium silicate (37.6% solids aqueous solution) | 14.7 |
| Zinc oxide | 5.7 |
| Diatomaceous earth | 4.9 |
| Kaolin clay | 4.9 |
| Pigment ($TiO_2$, $Cr_2O_3$ and $Fe_2O_3$) | 11.6 |
| Total | 100.0 |

Subsequent to the application of this silicate coating composition to the warm asbestos-cement sheets, they were subjected to a thermal drying constituting a gradual or stepped heat increase over several hours culminating at about 400° F., viz. 7 hours at 200° F., 4 hours at 250° F., 4 hours at 350° F., 3 hours at 350° F. and 3 hours at 400° F., followed by a thermal insolubilization of the coating by heating the coated surface to about 550° F. for 5 minutes. On cooling, the treated and coated surface of the sheets was polished, then examined and compared with like produced and identically coated and cured asbestos-cement sheets but without the pretreatment or application of the monoammonium phosphate or other acid-salt agents of this invention.

Both the treated and untreated silicate coated products were carefully examined and compared to ascertain and evaluate the extent or degree of any blistering of the surface of the silicate coating, and its adhesion to the asbestos-cement substrate to determine the improvement in the materials treated according to this invention with the otherwise identical untreated materials as standards. Blister ratings were determined by means of a careful visual examination utilizing an inspection lens of a 5 power magnification and critically inspecting the complete coated surface of each 4 feet x 8 feet sheet sample. The effects of the treatment of this invention or intermediate application of the acid-salts agent thereof upon the adhesion and bonding of the subsequently applied silicate coating was determined and evaluated by firmly pressing a 2-inch wide strip of pressure sensitive cloth tape over a surface of a coated sample and then quickly pulling the tape away from the coated surface. The amount of the silicate coating that adhered to the tape when it was removed from the surface was used as a measure of coating adhesion.

The data derived from the foregoing examinations and comparisons conclusively establish that the treatment of this invention markedly increased the adhesion of the silicate coatings to the asbestos-cement substrate, and retarded blistering of the silicate coating surface to the point of markedly reducing the reject rate of the untreated products in the production run forming the basis for the aforementioned tests from about 15% rejects to about 1.5% rejects. The sample compositions of the 4 feet x 8 feet asbestos-cement sheet products of the examples, their thickness and other relevant data and the test results of the previously described examinations and evaluations are all set forth in the hereinafter Table I to facilitate examination and comparison. The given rating standards are as follows:

| Rating No. | Blisters of Coating | Coating Adhesion by Tape Test |
|---|---|---|
| 0 | None observed | No failure. |
| 1 | Detectable with inspection lens | Failure on up to 2% of area. |
| 2 | Small and recognizable at reading distance | Failure on 2 to 10% of area. |
| 3 | Large and very noticeable | Failure on 11 to 25% of area. |
| 4 | Blisters broken or coating peeled off | Failure on more than 25% of area. |

TABLE I

| Base Material (percent by weight) | Example | Thickness inches | Standard Sheets (Not Pretreated): Sheets tested | Sheets rejected | Blister rating | Tape adhesion rating | Special Pretreated Sheets: Sheets tested | Sheets rejected | Blister rating | Tape adhesion rating |
|---|---|---|---|---|---|---|---|---|---|---|
| Asbestos 45%, Cement 33%, Silica 20%, Pigment 2%. | 1 | 1¼ | 5 | 3 | 1.4 | 0 | 10 | 1 | 0.1 | 0 |
| | 2 | 1¼ | 5 | 5 | 0 | 3.1 | 10 | 0 | 0 | 0.3 |
| | 3 | ¼ | 5 | 0 | 0 | 2.4 | 20 | 0 | 0 | 0 |
| | 4 | ¼ | 5 | 1 | 0.4 | 2.6 | 10 | 0 | 0 | 0.2 |
| Asbestos 45%, Cement 35%, Silica 20% | 5 | ¾ | 5 | 0 | 0 | 1.6 | 5 | 0 | 0 | 0 |
| | 6 | ¾ | 5 | 0 | 0 | 2.1 | 5 | 1 | 0 | 0 |
| | 7 | ¾ | 5 | 1 | 0 | 0.6 | 5 | 0 | 0 | 0.2 |
| | 8 | ¼ | 5 | 0 | 0 | 0.4 | 5 | 0 | 0 | 0 |
| | 9 | ¼ | 5 | 0 | 0 | 0 | 5 | 0 | 0 | 0 |
| | 10 | ¼ | 5 | 0 | 0 | 0 | 5 | 0 | 0 | 0 |

Further silicate coating applications of a typical composition as set forth hereinbefore employing pigmented 4 feet x 8 feet, steam cured, asbestos-cement base sheets of about 100 p.c.f. density produced from 45% asbestos, 33% portland cement, 20% silica and 2% pigment, each by weight, both with pretreatment by one of several different acid solutions of this invention, and without any pretreatment to provide a standard were carried out and examined under the same conditions as described hereinbefore. The aforedescribed pressure sensitive tape adhesion test was made on samples of each of the treated sheets of Examples 10 through 13 and the standard untreated sheets, both following completion of the foregoing manufacturing procedure and after exposure to steam blasting wherein the coated sample was placed a half-inch below the end of a ⅛-inch pipe nipple through which steam at 100 p.s.i. gauge pressure was blasted onto the coating for 10 minutes. The area of the coating exposed to the steam was then examined for softening and adhesions with the aforementioned tape test. These products were further examined as to their resistance to freeze and thaw conditions with samples of each being exposed to 5 cycles of freezing followed by thawing. The cupric ammonium sulfate and monoammonium phosphate treated sheets of this invention were found to be superior in this regard to any untreated samples.

The shear hardness of the silicate coatings applied to the various samples of this latter investigation was determined and compared by using a Taber abraser provided with a number 3 cutting tool. Each sample was tested by placing the same on a turntable and rotating it approximately ¼ turn. The width of the scratch thus made was measured and used to calculate the shear hardness as follows:

$$\text{Shear hardness} = \frac{\text{load on arm} \times 100}{\text{width of scratch}}$$

As the load on the arm was the same for all coatings tested, the width of the scratch was a direct index of the shear hardness which averaged about 20% harder for the samples pretreated according to this invention with the solutions of monoammonium phosphate, dibasic ammonium phosphate, cupric ammonium sulphate and ammonium chloride over the standard coatings. The blister and adhesion tests results for each of the samples is set forth in the following Table II. In Examples 10 through 13, the asbestos-cement sheets were dried for 16 hours at temperatures ranging up to 400° F. prior to the application of the given acid salt agent. The silicate coatings of these samples were then fired and insolubilized in an infrared heated conveyorized oven wherein the coated surface temperature was raised from 100° F. to 350° F. in 10 minutes and over the next 5 minutes to 570° F.

TABLE II

| Example No. | Thickness in inches | No treatment | 5% Acid aluminum phosphate | 5% Cupric ammonium sulphate | 5% Mono-ammonium phosphate |
|---|---|---|---|---|---|
| 10 | 1¼ | 2 2 3 | 1 1 0 | 0 0 1 | 1 0 1 |
| 11 | 1 | 1 2 3 | 1 0 1 | 0 1 1 | 0 0 0 |
| 12 | ¾ | 1 1 2 | 0 0 1 | 0 1 0 | 0 0 1 |
| 13 | ¼ | 0 0 0 | 0 0 0 | 0 0 0 | 0 0 0 |

Key to Data in Table:
1. In each series of three digits the 1st digit is the blister rating after baking. 2nd digit is the tape adhesion test after baking. 3rd digit is the tape adhesion test after the steam blast exposure.
2. The ratings of the individual digits are, (a) Blisters:
0—no blisters.
1—blisters detectable using 10X magnification.
2—blisters small in size but easily recognized at reading distance.
3—blisters up to ⅛ in. dia. with no break through.
4—large blisters with break through.
(b) Tape adhesion test:
0—no failure.
1—failure on up to 2% of area.
2—failure on 2% to 10% of area.
3—failure on 11% to 25% of area.
4—failure on more than 25% of area.

The pretreated samples moreover exhibited superior resistance of their coatings to deterioration in the aforementioned solid freeze-thaw exposure cycles.

The concept and means of this invention comprising the pretreatment with the given acid salt agents, is by itself applicable and highly effective in insolubilizing and securing the subsequent silicate coating to the cementitious substrate evidently through a "chemical" mechanism(s), and as such appears to augment or enhance the "thermally" incited mechanism of the prior art. Thus, although it is highly desirable to utilize both means and derive the benefits of each providing maximum permanency of the coatings, this invention also includes the concept of simply "chemically" acting upon the cementitious substrate and silicate coating without a subsequent thermal treatment, which in itself consists of a highly effective and practical means of treating edge and the like surfaces resulting from cutting, machining or other working in the field leaving exposed surfaces and wherein subsequent thermal insolubilization is not practical or possible. The following illustrates the application of the pretreatment of this invention without the use of the thermal insolubilization of the silicate coating material of the prior procedures, and comprises a technique adaptable to field conditions where surfaces are newly exposed due to cutting, etc., and thermal treatment means are not available or practical.

EXAMPLE 14

Newly cut edges and surfaces of the cementitious products of Examples 1 to 4, sanded with No. 80 grit paper to smooth the saw marks, were painted by brush with a 5% by weight aqueous solution of monoammonium phosphate in amounts designed to provide a coverage of about 10 grams of solution per square foot. The thus treated edges and cuts were air dried a minimum of 10 minutes before the silicate coating was applied by spraying.

The silicate coating consisted, in percentages by weight, of:

| | Percent |
|---|---|
| Potassium silicate (27.3% solids aqueous sol.) | 60.4 |
| Sodium silicate (37.6% solids aqueous sol.) | 17.1 |
| Diatomaceous earth | 4.6 |
| Kaolin clay | 6.8 |
| Pigments ($TiO_2$, $Cr_2O_3$ and $Fe_2O_3$) | 11.1 |
| Total | 100.0 |

To facilitate the spray application of this silicate coating composition, a sodium metasilicate solution ($Na_2SiO_3 \cdot 5H_2O$) of about 3% solids concentration was added in small increments to adjust the silicate solution to achieve better spraying viscosities, etc., pursuant to the disclosure of Patent No. 3,197,529. Also a monoammonium phosphate solution of about 5% by weight was added and admixed with the foregoing silicate coating composition in proportion of 1 part by weight of the acid salt solution to about 5 parts by weight of the silicate solution as an accelerator and insolubilizer for the coating. This accelerated silicate coating preparation was spray applied to the aforementioned pretreated edge and cut surfaces at a rate designed to effect a coverage of about 14±2 grams per square foot surface area. Upon air drying one day these coatings were compared with directly applied and unmodified silicate coatings of like compositions without the accelerator and found to be decidedly superior in both coating film adhesion and abrasion resistance over the prior means.

The pronounced advantages and benefits of this invention are attainable whenever the aforesaid prior art silicate coatings are applied to calcareous cement and asbestos or the like reinforced materials, and products thereof, whether normal or steam cured, and including portland cements and the common hydrated calcium silicate products of the hydrothermal action of lime and silica.

It will be understood that the foregoing details are given for purposes of illustration and not restriction, and that variations within the spirit of this invention are to be included within the scope of the appended claims.

What we claim is:

1. In the method of manufacturing silicate coated asbestos-cement articles comprising applying a solution comprising at least one soluble silicate selected from the group consisting of sodium silicate and potassium silicate and insolubilizing the silicate to produce an insoluble silicate coating composition on the surface of the asbestos-cement article: the improvement comprising pretreating the surface of the asbestos-cement article by previously applying to said surface a dilute aqueous solution consisting essentially of approximately 3 to approximately 10% by weight of at least one acid salt selected from the group consisting of monoammonium phosphate, dibasic ammonium phosphate, acid aluminum phosphate, and cupric ammonium sulfate, in amount of at least 2 to about 20 grams of solution per square foot of surface of asbestos-cement.

2. In the method of manufacturing silicate coated asbestos-cement articles comprising applying a solution comprising at least one soluble silicate selected from the group consisting of sodium silicate and potassium silicate to the surface of the asbestos-cement article while said surface is at a temperature of approximately 90° F. to approximately 150° F. and insolubilizing the silicate to produce an insoluble silicate coating composition thereon: the improvement comprising pretreating the surface of the asbestos-cement article by previously applying to said surface a dilute aqueous solution consisting essentially of approximately 3 to approximately 10% by weight of at least one acid salt selected from the group consisting of monoammonium phosphate, acid aluminum phosphate, dibasic ammonium phosphate, and cupric ammonium sulfate, in amount of at least about 2 to about 20 grams of solution per square foot of surface of asbestos-cement.

3. In the method of manufacturing silicate coated asbestos-cement articles comprising applying a solution comprising at least one soluble silicate selected from the group consisting of sodium silicate and potassium silicate and zinc oxide and kaolin clay to the surface of the asbestos-cement article while said surface is at a temperture of approximately 90° F. to approximately 150° F. and thereafter heating the said silicate coated surface of the asbestos-cement article to approximately 500° F. to approximately 700° F. to insolubilize the silicate coating thereon: the improvement comprising pretreating the surface of the asbestos-cement article by previously applying to said surface a dilute aqueous solution consisting essentially of approximately 3 to approximately 10% by weight of at least one acid salt selected from the group consisting of monoammonium phosphate, acid aluminum phosphate, dibasic ammonium phosphate, and cupric ammonium sulfate, in amount of about 2 to about 20 grams of solution per square foot of surface of the asbestos-cement.

4. In the method of manufacturing silicate coated asbestos-cement articles comprising applying a solution comprising at least one soluble silicate selected from the group consisting of sodium silicate and potassium silicate to the surface of the asbestos-cement article while said surface is at a temperature of approximately 90° F. to approximately 150° F. and thereafter heating the said silicate coated surface of the asbestos-cement article to insolubilize the silicate coating thereon: the improvement comprising pretreating the surface of the asbestos-cement article by previously applying to said surface an aqueous solution consisting essentially of approximately 3 to approximately 10% by weight of at least one acid salt selected from the group consisting of monoammonium phosphate, acid aluminum phosphate, dibasic ammonium phosphate, and cupric ammonium sulfate, in amount of about 2 to about 20 grams of solution per square foot of surface of the asbestos-cement.

5. In the method of manufacturing silicate -coated asbestos-cement articles comprising applying a solution comprising at least one soluble silicate selected from the group consisting of sodium silicate and potassium silicate and zinc oxide and kaolin clay to the surface of the asbestos-cement article while said surface is at a temperature of approximately 90° F. to approximately 150° F. and thereafter heating the said silicate coated surface of the asbestos-cement article to approximately 500° F. to approximately 700° F. to insolubilize the silicate coating thereon: the improvement comprising pretreating the surface of the asbestos-cement article by previously applying to said surface an aqueous solution consisting essentially of approximately 5% by weight of at least one acid salt selected from the group consisting of monoammonium phosphate, acid aluminum phosphate, dibasic ammonium phosphate, and cupric ammonium sulfate, in amount of about 2 to about 20 grams of solution per square foot of surface of the asbestos-cement.

6. In the method of manufacturing silicate coated asbestos-cement articles comprising applying a solution comprising at least one soluble silicate selected from the group consisting of sodium silicate and potassium silicate to the surface of the asbestos-cement article while said surface is at a temperature of approximatelly 105° F. to approximately 130° F. and thereafter heating the said silicate coated surface of the asbestos-cement article to approximately 500° F. to approximately 700° F. to insolublize the silicate coating thereon: the improvement comprising pretreating the surface of the asbestos-cement article by previously applying to said surface an aqueous solution consisting essentially of approximately 5% by weight of at least one acid salt selected from the group consisting of monoammonium phosphate, acid aluminum phosphate, dibasic ammonium phosphate, and cupic ammonium sulfate, in amount of about 5 to about 10 grams of solution per square foot of the surface of asbestos-cement.

7. In the method of manufacturing silicate coated asbestos-cement articles comprising applying a solution comprising at least one soluble silicate selected from the group consisting of sodium silicate and potassium silicate, and zinc oxide, kaolin clay, and diatomaceous earth to the surface of the asbestos-cement article while said surface is at a temperature of approximately 105° F. to approximately 130° F. and thereafter heating the said silicate coated surface of the asbestos-cement article to 500° F. to approximately 700° F. to insolubilize the silicate coating thereon: the improvement comprising pretreating the surface of the asbestos-cement article by previously applying to said surface an aqueous solution consisting essentially of approximately 5% by weight of at least one acid salt selected from the group consisting of monoammonium phosphate, acid aluminum phosphate, dibasic ammonium phosphate, and cupric ammonium sulfate, in amount of about 5 to about 10 grams of solution per square foot of the surface of asbestos-cement.

8. In the method of manufacturing silicate coated asbestos-cement articles comprising applying a solution comprising at least one soluble silicate selected from the group consisting of sodium silicate and potassium silicate, and zinc oxide, kaolin clay, and diatomaceous earth to the surface of the asbestos-cement article while said surface is at a temperature of approximately 105° F. to approximately 130° F. and contains less than about 2% by weight thereof of water, and thereafter heating the said silicate coated surface of the asbestos-cement article to approximately 500° F. to approximately 700° F. to insolubilize the silicate coating thereon: the improvement comprising pretreating the surface of the asbestos-cement article by previously applying to said surface a dilute aqueous solution consisting essentially of approximately 3 to approximately 10% by weight of at least one acid salt selected from the group consisting of monoammonium phosphate, acid aluminum phosphate, dibasic ammonium phosphate, and cupric ammonium sulfate, in amount of about 5 to about 10 grams of solution per square foot of surface of the asbestos-cement.

9. In the method of manufacturing silicate coated asbestos-cement articles comprising applying a solution comprising at least one soluble silicate selected from the group consisting of sodium silicate and potassium silicate, and zinc oxide, kaolin clay, and diatomaceous earth to the surface of the asbestos-cement article while said surface is at a temperature of approximately 105° F. to approximately 130° F. and thereafter heating the said silicate coated surface of the asbestos-cement article to approximately 500° F. to approximately 700° F. to insolubilize the silicate coating thereon: the improvement comprising pretreating the surface of the asbestos-cement article by previously applying to said surface a dilute aqueous solution consisting essentially of approximately 5% by weight of monoammonium phosphate in amount of about 5 to about 10 grams of the said solution per square foot of surface area of the asbestos-cement.

10. An improved silicate coated asbestos-cement article having an insolubilized silicate coating thereon comprising the product of a solution of silicate coating composition comprising soluble sodium silicate, soluble potassium silicate, zinc oxide and kaolin clay, having been applied to the surface of the asbestos-cement article while said surface is at a temperature of approximately 90° F. to approximately 150° F. and the said applied silicate coating insolubilized thereon by heating to approximately 500° F. to approximately 700° F.: the improved silicate coating on the asbestos-cement article being the result of the article being produced with its asbestos-cement surface having been pretreated by previously applying to said surface a dilute aqueous solution consisting essentially of approximately 3 to approximately 10% by weight of at least one acid salt selected from the group consisting of monoammonium phosphate, acid aluminum phosphate, dibasic ammonium phosphate, and cupric ammonium sulfate, in amount of about 2 to about 20 grams of solution per square foot of the surface of the asbestos-cement article.

References Cited

UNITED STATES PATENTS

| | | | |
|---|---|---|---|
| 2,444,347 | 6/1948 | Greger et al. | 117—126 |
| 2,610,957 | 9/1952 | Steinman et al. | 117—126 XR |
| 3,078,186 | 2/1963 | Tierney | 117—169 XR |
| 3,082,133 | 3/1963 | Hofman et al. | |
| 3,197,529 | 7/1965 | Greiner | 117—54 XR |

ALFRED L. LEAVITT, Primary Examiner

W. F. CYRON, Assistant Examiner

U.S. Cl. X.R.

117—70, 123, 126, 169